July 18, 1967 H. KRAUSS 3,331,642
BEARING
Filed March 13, 1964
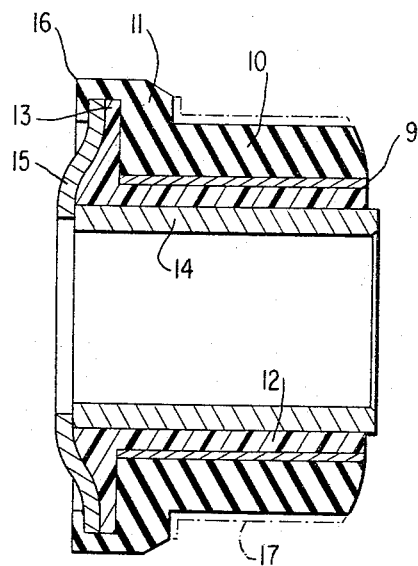
INVENTOR
HEINZ KRAUSS
BY *Dicke & Craig*
ATTORNEYS

United States Patent Office 3,331,642
Patented July 18, 1967

3,331,642
BEARING
Heinz Krauss, Stuttgart, Germany, assignor to Daimler-Benz Aktiengesellschaft, Stuttgart-Unterturkheim, Germany
Filed Mar. 13, 1964, Ser. No. 351,672
Claims priority, application Germany, Mar. 22, 1963, D 41,194
4 Claims. (Cl. 308—36.1)

The present invention relates to an improvement and further development of an elastic bearing, and more particularly to a further improvement of an elastic rubber bearing, especially for the pivotal connection of vehicle wheel guide members, provided with a rubber bushing and a bearing bushing lining the rubber bushing and made of plastic or similar self-lubricating frictionless material of the type described in the copending application Ser. No. 246,429, filed in the United States Patent Office on December 21, 1962, and assigned to the same assignee as the present application. The subject matter of this copending application is incorporated herein by reference to the extent necessary.

The present invention essentially consists in that a metallic reinforcing bushing, especially of steel, is provided between the rubber and plastic bushings.

The steel bushing prevents deformation of the plastic bushing within the soft rubber bushing under heavier loads on the former. As a result thereof, the bearing friction of the joint bolt extending into the bushing is small. As a consequence, the tendency toward hardening or stiffening of the wheel spring system, is kept small.

Accordingly, it is an object of the present invention to provide an elastic bearing construction of the type described hereinabove which further improves the operational characteristics thereof.

Another object of the present invention resides in the provision of a bearing assembly of the type described above which prevents deformations, particularly of the plastic bushing in case of relatively larger loads.

Still a further object of the present invention resides in the provision of a bearing construction for the pivotal connection of wheel guide members of a vehicle spring suspension which not only maintains a relatively small bearing friction within the bushing, but also precludes thereby any noticeable increase in the spring stiffness that might occur otherwise.

These and other objects, features and advantages of the present invention will become more obvious from the following description when taken in connection with the accompanying drawing which shows, for purposes of illustration only, one embodiment in accordance with the present invention.

Referring now to the single figure of the drawing which represents a longitudinal cross-sectional view through one embodiment of an improved rubber bearing in accordance with the present invention, the bearing illustrated therein consists of the rubber bushing 10 which forms, at the one end thereof, namely the left end as viewed in the drawing, a radial flange 11. On the inside thereof, the rubber bushing 10 is provided with a relatively thin steel bushing 9. A plastic bushing 12 of polyamide, Delerin, acetal resins, or the like, in turn, extends through the steel bushing 9. The plastic bushing 12 also forms a radial flange 13 in front of the left end of the steel bushing 9 facing the flange 11. The radial flange 13 abuts directly against the flange 11 of the rubber bushing 10. The rubber bushing 10 provided with the steel bushing 9 and the plastic bushing 12 slides on a metal bushing 14, on whose end facing the flange 11 is secured an S-shaped bent metallic ring disc 15 in such a manner that the bushings 10 and 12 with the radial flanges 11 and 13 thereof axially abut against the metal disc 15. A sealing lip 16 projecting from the rubber flange 11 extends over the rim of the disc 15. Possibly the rubber bushing 10 may also be provided with an external metal bushing 17 as indicated in dash and dot lines in the drawing. The rubber bushing 10 may be connected with the metallic bushings 9 and 17 by bonding, cementing, vulcanizing, or also by only simple press-fit. The plastic bushing 12 may be connected with the steel bushing 9 in a similar manner.

With the use of the bushing assembly according to the present invention for the pivotal connection of a wheel guide member, the bushing is inserted into the bearing eye of the vehicle frame or vehicle body, the joint bolt is extended through the inner metal bushing 14 and is then threadably secured thereat.

As shown in the drawing, the metal disc 15 is held in place by the sealing lip 16 which extends, as mentioned above, over the outer edge and radially inwardly over a small portion of the exposed surface of the metal disc 15.

While I have shown and described one embodiment in accordance with the present invention, it is understood that the same is not limited thereto, but is susceptible of numerous changes and modifications as known to a person skilled in the art, and I therefore do not wish to be limited to the details shown and described herein, but intend to cover all such changes and modifications as are encompassed by the scope of the appended claims.

I claim:
1. An elastic bearing, comprising:
    rubber bushing means,
    plastic bearing bushing means having an inner cylindrical bearing surface within said rubber bushing means,
    and a relatively thin metallic reinforcing bushing between said rubber bushing means and said plastic bearing bushing means,
    metal disc means holding said bushing means in axial alignment with one another,
    said rubber bushing means passing over into a substantially radial flange at one end thereof,
    metallic bushing means having an outer cylindrical bearing surface in rotatable bearing contact with said inner cylindrical bearing surface, and said rubber bushing means including sealing lip means extending from said radial flange and comprising a radially inwardly extending lip member holding said metal disc means in place.

2. A rubber bearing for joints, especially for the pivotal connection of wheel guide members in motor vehicles, comprising:
    rubber bushing means,
    a relatively thin metallic reinforcing bushing on the inside of said rubber bearing bushing means,
    and means on the inside of said metallic reinforcing bushing forming effectively a sliding layer having an inner cylindrical self-lubricating surface and constituted by a bushing made of plastic material,
    said rubber bushing means being provided with substantially radial flange means at one end thereof having an axially extending cylindrical portion and with sealing lip means extending radially inwards from said cylindrical portion,
    said plastic bushing being provided with substantially radial flange means directly abutting against the radial flange means of said rubber bushing means,
    metal disc means holding said flange means in axial abutment with one another, said sealing lip means holding said metal disc means in place,
    and a metallic bushing member fixed to said metal disk means and in rotatable sliding contact with the interior of said plastic bushing.

3. A rubber bearing for joints, especially for the pivotal connection of wheel guide members in motor vehicles, comprising:
rubber bushing means,
a relatively thin metallic reinforcing bushing made of steel on the inside of said rubber bearing bushing means, said bushing having inner and outer cylindrical surfaces,
and a bushing contacting said inner cylindrical surface, said bushing being formed of self-lubricating plastic material,
said rubber bushing means being provided with substantially radial flange means at one end thereof having a cylindrical portion and with sealing lip means extending radially inwardly from said cylindrical portion,
said plastic bushing being provided with substantially radial flange means directly abutting against the radial flange means of said rubber bushing means,
and metal disc means holding both said flange means in axial abutment with one another, said sealing lip means holding said metal disc means in place.

4. An elastic bearing, comprising; rubber bushing means, plastic bearing bushing means within said rubber bushing means, and a relatively thin metallic reinforcing bushing between said rubber bushing means and said plastic bearing bushing means, said rubber bushing means passing over into a substantially radial flange at one end thereof, said plastic bushing means being provided with a substantially radial flange directly abutting against the radial flange of said rubber bushing, metal disc means holding both said flange means in axial abutment with one another, metallic sleeve means having an outer cylindrical bearing surface in rotatable contact with the interior of said plastic bushing means, and said rubber bushing means is provided with sealing lip means extending from said radial flange, said sealing lip means comprising a radially inwardly extending lip member holding said metal disc means in place.

References Cited

UNITED STATES PATENTS

| 2,722,464 | 11/1955 | Galaba | 308—26 |
| 2,823,962 | 2/1958 | Leonard | 308—26 |
| 2,827,303 | 3/1958 | Herbenar | 38—26 |
| 3,039,831 | 6/1962 | Thomas | 287—85 X |
| 3,055,688 | 9/1962 | Melton et al. | |
| 3,133,769 | 5/1964 | Drake | 308—36.1 |

FOREIGN PATENTS

| 805,538 | 12/1958 | Great Britain. |
| 828,065 | 2/1960 | Great Britain. |

MARTIN P. SCHWADRON, *Primary Examiner.*

DAVID J. WILLIAMOWSKY, *Examiner.*

N. ABRAMS, R. F. HESS, *Assistant Examiners.*